United States Patent [19]

Kagata et al.

[11] Patent Number: 5,459,115
[45] Date of Patent: Oct. 17, 1995

[54] COMPOSITION OF DIELECTRIC CERAMICS

[75] Inventors: Hiroshi Kagata, Neyagawa; Tatsuya Inoue; Ichiro Kameyama, both of Takatsuki; Junichi Kato, Osaka; Keiji Nishimoto, Takatsuki, all of Japan

[73] Assignee: Matsushita Electric Industrial Co., Ltd., Osaka, Japan

[21] Appl. No.: 124,552

[22] Filed: Sep. 22, 1993

[30] Foreign Application Priority Data

Sep. 22, 1992 [JP] Japan .................. 4-252449
Feb. 1, 1993 [JP] Japan .................. 5-014463

[51] Int. Cl.⁶ .............................. C04B 35/46
[52] U.S. Cl. .............. 501/135; 501/136; 252/62.9
[58] Field of Search .............. 252/62.9; 501/135, 501/136, 139

[56] References Cited

U.S. PATENT DOCUMENTS

| | | | |
|---|---|---|---|
| 4,330,631 | 5/1982 | Kawashima et al. | 501/139 |
| 4,544,644 | 10/1985 | Yamashita et al. | 501/134 |
| 4,806,511 | 2/1989 | Hayashi | 501/135 |
| 5,182,695 | 1/1993 | Handa et al. | 501/136 |

FOREIGN PATENT DOCUMENTS

| | | | |
|---|---|---|---|
| 0078200 | 5/1983 | European Pat. Off. | 501/134 |
| 0121161 | 10/1984 | European Pat. Off. | H01B 3/12 |
| 0460231 | 12/1991 | European Pat. Off. | C04B 35/00 |
| 2701411 | 7/1977 | Germany | 501/134 |
| 0148807 | 9/1982 | Japan | 501/134 |
| 5-20925 | 1/1993 | Japan . | |

*Primary Examiner*—Deborah Jones
*Attorney, Agent, or Firm*—Wenderoth, Lind & Ponack

[57] ABSTRACT

The dielectric composition according to the present invention is used in a microwave band and is characterized in having a low sintering temperature and a property to be controllable independently in the respect of a dielectric constant and a temperature coefficient of the resonant frequency.

The dielectric composition is represented by the formula:

$$A_{1+a}BO_{3+a} \ (a \leq 0)$$

wherein A site mainly contains at least Pb atom and Ca atom which is more than 20 wt % of A and further may contain Sr or Ba atom, and B site mainly contains Fe and Nb atoms and further contains at least one atom selected from the group comprising Ti and W and may contain at least one atom selected from the group comprising Cr, Mn, Co, Ni, Cu, Zn, Si, Al, Mg, Bi and Sb.

8 Claims, 4 Drawing Sheets

— $(Pb_{1-x}Ca_x)(Fe_{1/2}Nb_{1/2})O_3$
--- $(Pb_{1-x}Ca_x)\{(Fe_{1/2}Nb_{1/2})_{1-y}(Fe_{2/3}W_{1/3})_y\}O_3$
---- $(Pb_{1-x}Ca_x)\{(Fe_{1/2}Nb_{1/2})_{1-y}Ti_y\}O_3$

COMPOSITION OF DIELECTRIC CERAMICS

BACKGROUND OF THE INVENTION

1. Field of the invention

The present invention relates to a composition of dielectric ceramics for use in a microwave band range.

2. Description of the Prior Art

In recent years much attention has been paid to a miniaturization of a movable communication apparatus using radio waves of a microwave band such as car telephones and portable telephone in association with the developments in the satellite broadcasts. In order to satisfy these requirements, it is necessary to miniaturize each of the components constituting the communication apparatus.

A dielectric body is assembled as a resonator in an oscillator or a filter device of the communication apparatus. The size of the resonator is in reverse proportion to the root of the dielectric constant of the dielectric body as long as the same resonating mode is used. Therefore, the miniaturization of the dielectric resonator requires a dielectric body having a high dielectric constant. In addition, in order to put the dielectric resonator into practical use, it is necessary to obtain a low loss, that is, a high Q value at a microwave band and further, a low temperature coefficient of the resonant frequency.

There have been recently developed various dielectric bodies for use in a resonator. For example, the U.S. patent Publication No. 4,330,631 disclosed a dielectric body of a $BaO\text{-}TiO_2\text{-}Sm_2O_3$ system having a high dielectric constant. The dielectric body of this system has a relative dielectric constant of about 80, a Q value of about 3000 at frequency of 2 to 4 GHz and a low temperature coefficient of resonant frequency.

A further miniaturization of the resonator requires a dielectric body having a higher relative dielectric constant at a micro wave band, a higher no-load Q and a lower temperature coefficient of resonant frequency. On the other hand, there has been proposed another dielectric bodies having a higher dielectric constant. Among them, Japanese Patent Tokkaihei 1993-20925 discloses a dielectric body represented by the formula:

$$(Pb_{1-x}Ca_x)_{1+a}(Fe_{1/2}Nb_{1/2})O_{3+a}$$

having a high dielectric constant of 90 or more and practical Q value and temperature characteristics. The sintering temperature is as low as about 1150° C.

However, in the case of the dielectric body represented by the formula:

$$(Pb_{1-x}Ca_x)_{1+a}(Fe_{1/2}Nb_{1/2})O_{3+a}$$

determination of x causes determination of the dielectric constant and the temperature coefficient of resonant frequency and the dielectric constant at $\tau_f=0$ can not be changeable, so that such a dielectric body is not practical for use. FIG. 1 shows a variation of the dielectric constant corresponding to the temperature coefficient of resonant frequency at x variation of the formula: $(Pb_{1-x}Ca_x)_{1+a}(Fe_{1/2}Nb_{1/2})O_{3+a}$ system. In the case of the above system, the dielectric constant is fixed to 90 at $\tau_f=0$, which value can not be adjusted to a lower one or a higher one. Accordingly, in order to make the system practical there is required a dielectric composition which dielectric constant and the temperature coefficient $\tau_f$ can be independently controlled. That is, there is a dielectric composition in which the variation curve of FIG. 1 can be shifted to a higher dielectric constant side or a lower dielectric constant side. In addition, in order to achieve a manufacturing process at a low cost, it is necessary to obtain a dielectric body which can be sintered at a lower temperature.

SUMMARY OF THE INVENTION

A first object of the present invention is to provide a composition of a dielectric body in which the dielectric constant and temperature coefficient can be controlled independently, that is, the dielectric constant at $\tau_f=0$ is controlled to be higher or lower.

A second object of the present invention is to provide a composition of dielectric body can be sintered at a lower temperature when compared with the conventional dielectric body and which is superior in dielectric characteristics in the microwave band.

According to the first aspect of the present invention, there is provided a composition of dielectric ceramics represented by the following formula:

$$A_{1+a}BO_{3+a} \quad (0.08 \leq a \leq 0)$$

wherein A site mainly contains at least Pb atom and Ca atom which is more than 20wt % of A, and B site mainly contains Fe and Nb atoms and further contains at least one atom selected from the group consisting of Ti and W which are a component to independently control a dielectric constant of the dielectric ceramics composition or a temperature coefficient of the resonant frequency thereof.

FIG. 2 shows substitution effect at B size in the generic formula: $A_{1+a}BO_{3+a}$ ($a \leq 0$). Apparent therefrom, the B site substitution by Ti can cause a lower dielectric constant at $\tau_f=0$, while the B site substitution by $(Fe_{2/3}W_{1/3})$ can cause a higher dielectric constant at $\tau_f=0$. Accordingly, the B site substitution by Ti or W makes the dielectric constant and the temperature coefficient of the resonant frequency adjusted depending on the substitution amount.

In the above composition represented by the formula: $A_{1+a}BO_{3+a}$, the A site may contain Sr or Ba atoms and also the B site may contains at least one atom selected from the group consisting of Cr, Mn, Co, Ni, Cu, Zn, Si, Al, Mg, Bi and Sb to the extent that no bad effects are obtained, such as the dielectric constant and Q value decrease and the temperature coefficient increase, as dielectric characteristics of the resultant dielectric body.

Therefore, in the first embodiment according to the present invention, there is provided the composition of dielectric ceramics which comprises lead oxide, calcium oxide, iron oxide, niobium oxide and titanium oxide and being represented by the following formula:

$$(Pb_{1-x}Ca_x)_{1+a}\{(Fe_{1/2}Nb_{1/2})_{1-y}Ti_y\}O_{3+a}$$

wherein x and y are within a phase diagram square area enclosed by the following four points A, B, C and D, but not including line A–B (y=0):
A: (x,y)=(0.43, 0.0);
B: (x,y)=(0.63, 0.0);
C: (x,y)=(0.74, 0.25);
D: (x,y)=(0.57, 0.25);
and a is defined by the following relation;

$$0.0 \leq a \leq 0.08$$

In the second embodiment of the present invention, there is provided the composition of dielectric ceramics, which comprises lead oxide, calcium oxide, iron oxide, niobium oxide and tungsten oxide and being represented by the following formula:

$$(Pb_{1-x}Ca_x)_{1+a}\{(Fe_{1/2}Nb_{1/2})_{1-z}(Fe_{2/3}W_{1/3})_z\}O_{3+a}$$

wherein x, z and a are defined by the following relations;

$0.43 \leq x \leq 0.63$ $0.0 < z \leq 0.5$ and $0.0 \leq a \leq 0.08$

Further, it is found that the A site substitution by Sr cause lowering the sintering temperature. Therefore, in the preferred third embodiment, there is provided the composition of dielectric ceramics which comprises lead oxide, calcium oxide, iron oxide, niobium oxide, titanium oxide and strontium oxide and being represented by the following formula:

$$\{(Pb_{1-x}Ca_x)_{1-z}Sr_z\}_{1+a}\{(Fe_{1/2}Nb_{1/2})_{1-y}Ti_y\}O_{3+a}$$

wherein x and y are within a phase diagram square area without y=0, enclosed by the following four points A, B, C and D, but not including line A–B (y=0):
A: (x,y)=(0.43, 0.0);
B: (x,y)=(0.63, 0.0);
C: (x,y)=(0.74, 0.25);
D: (x,y)=(0.57, 0.25);
and a and z are defined by the following relations;

$0.0 \leq a \leq 0.08$ $0.0 < z \leq 0.4$

In the preferred fourth embodiment of the present invention, there is provided the composition of dielectric ceramics, which comprises lead oxide, calcium oxide, strontium oxide, iron oxide, niobium oxide and tungsten oxide and is represented by the following formula:

$$(Pb_{1-x-y}Ca_xSr_y)_{1+a}\{(Fe_{1/2}Nb_{1/2})_{1-z}(Fe_{2/3}W_{1/3})_z\}O_{3+a}$$

wherein x and y are within a phase diagram square area enclosed by the following four points A, B, C and D, but not including line A–D (y=0):
A: (x,y)=(0.43, 0.0);
B: (x,y)=(0.3, 0.13);
C: (x,y)=(0.3, 0.4);
D: (x,y)=(0.7, 0.0);
and a and z are defined by the following relations;

$0.0 \leq a \leq 0.08$ $0.0 < z \leq 0.7$

In the above preferred embodiments, a part or all of Nb atoms of the composition may be substituted by Ta atom or atoms in order to lower the sintering temperature. Therefore, there are provided the composition according to the first and the third embodiment, represented by the following formula:

$$\{(Pb_{1-x}Ca_x)_{1-z}Sr_z\}_{1+a}\{Fe_{1/2}(Ta_{1-m}Nb_m)_{1/2}\}_{1-y}Ti_y\}O_{3+a}$$

wherein m is defined by the following relation;

$0.0 \leq m < 1.0$ or the composition according to the second and the fourth embodiment, represented by the following formula:

$$(Pb_{1-x-y}Ca_xSr_y)_{1+a}\{Fe_{1/2}(Ta_{1-m}Nb_m)_{1/2}\}_{1-z}(Fe_{2/3}W_{1/3})_z\}O_{3+a}$$

wherein m is defined by the following relation;

$0.0 \leq m < 1.0$

BRIEF DESCRIPTION OF THE DRAWINGS

The invention will now be described by way of example with reference to the accompanying drawings in which.

$$(Pb_{1-x}Ca_x)_{1+a}\{(Fe_{1/2}Nb_{1/2})_{1-y}M_y\}O_{3+a}$$

Figure 1:
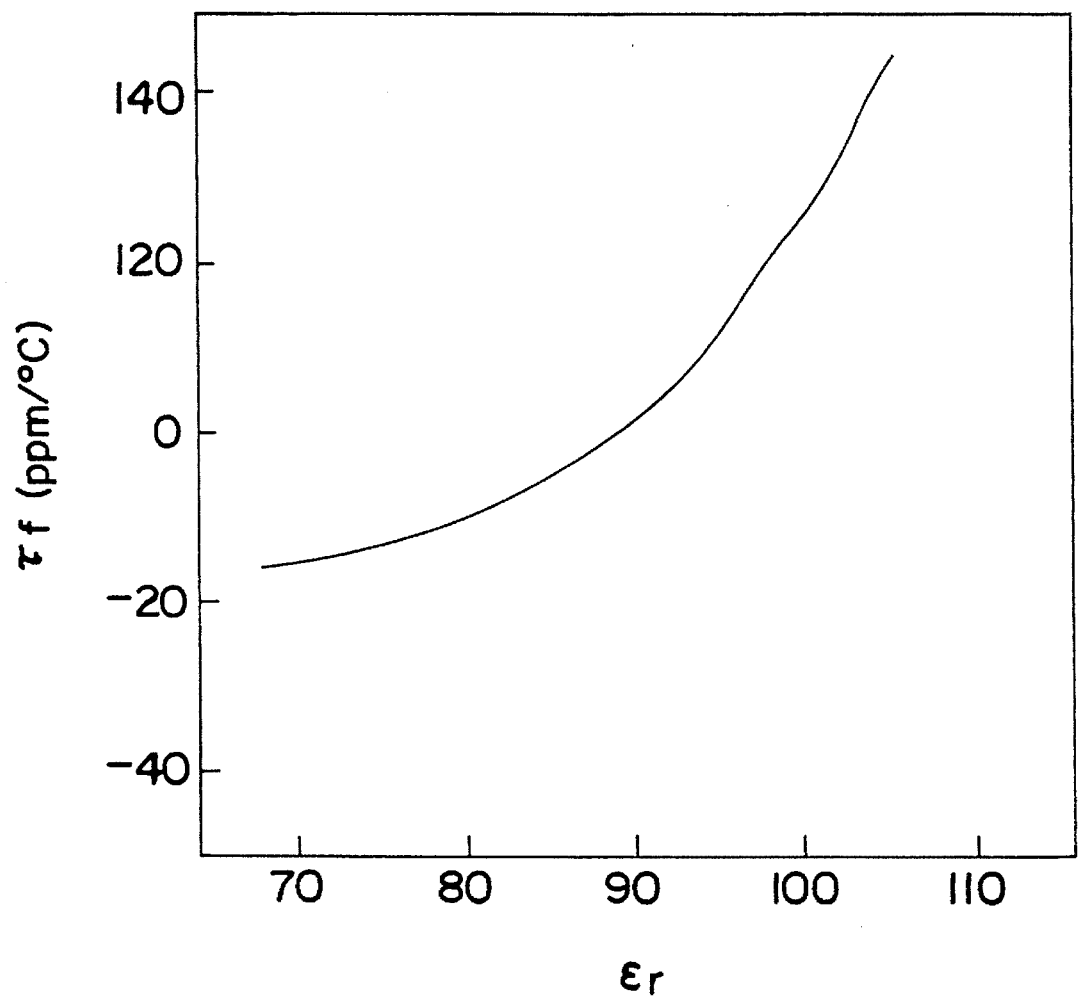
FIG. 1 is a graph showing a relation between the dielectric constant and the temperature coefficient of resonant frequency depending on x variation of the system represented by the formula.
Figure 2:
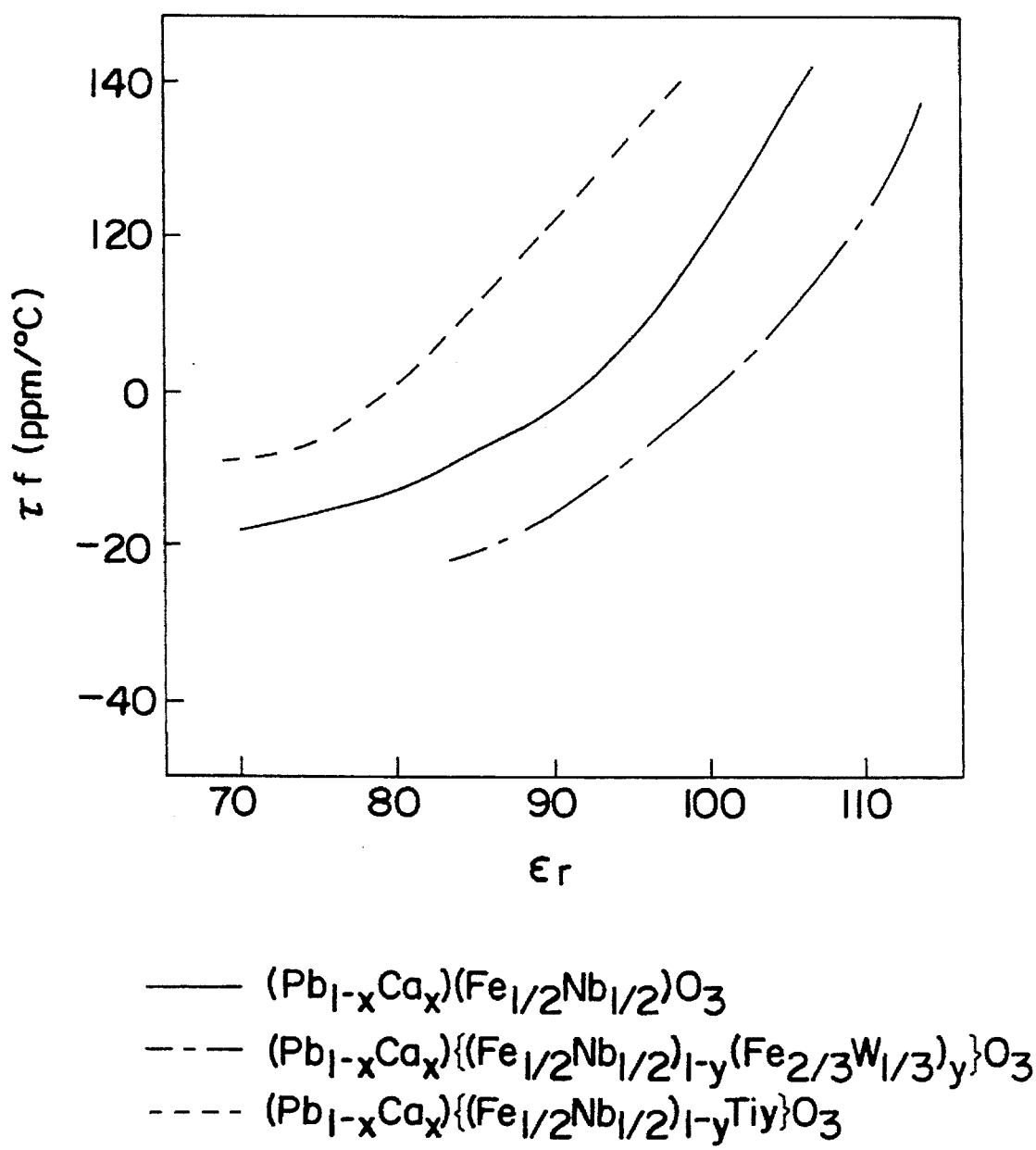

FIG. 2 is a graph showing a B site substitution effect by Ti or $(Fe_{2/3}W_{1/3})$ in the relation between the dielectric constant and the temperature coefficient of resonant frequency depending on x variation of the system represented by the formula:

$$(Pb_{1-x}Ca_x)_{1+a}\{(Fe_{1/2}Nb_{1/2})_{1-y}M_y\}O_{3+a}$$

wherein M is Ti or $(Fe_{2/3}W_{1/3})$.

Figure 3:
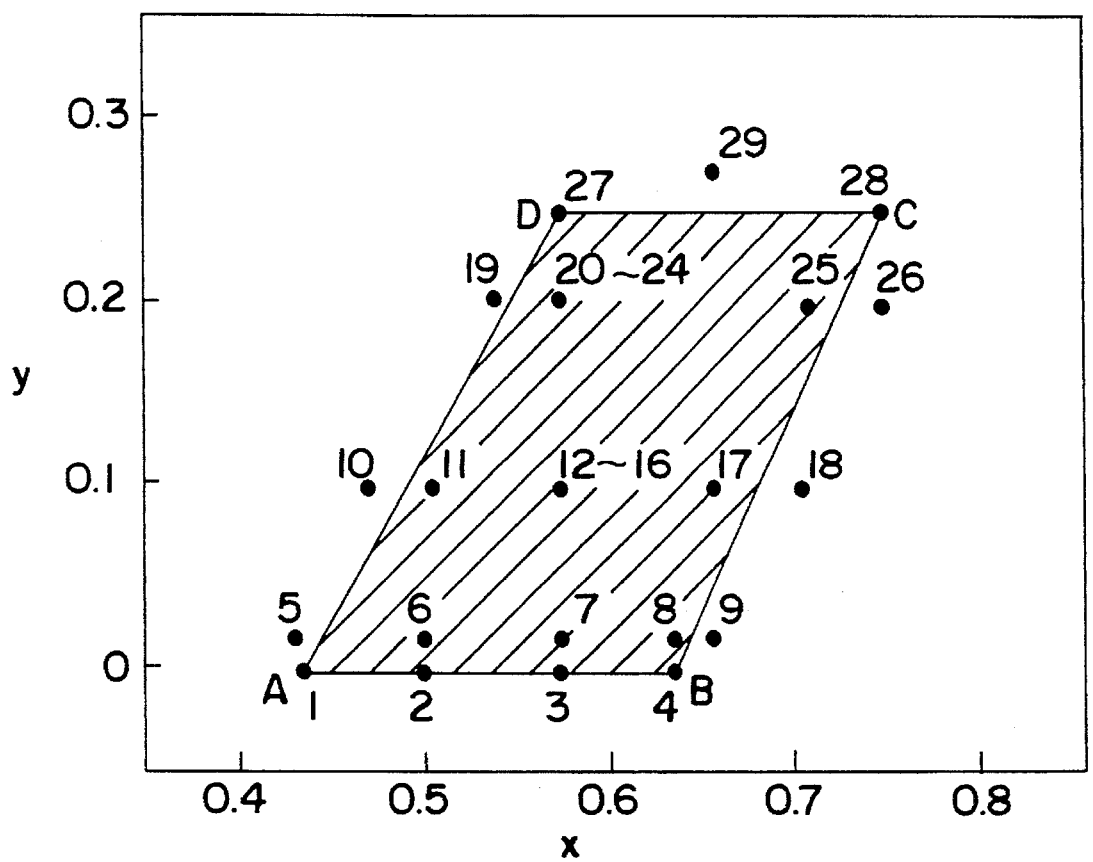

FIG. 3 shows a preferred zone of x and y in the system represented by the formulas:

$$(Pb_{1-x}Ca_x)_{1+a}\{(Fe_{1/2}Nb_{1/2})_{1-y}Ti_y\}O_{3+a}$$

or $$\{(Pb_{1-x}Ca_x)_{1-z}Sr_z\}_{1+a}\{(Fe_{1/2}Nb_{1/2})_{1-y}Ti_y\}O_{3+a}.$$

Figure 4:
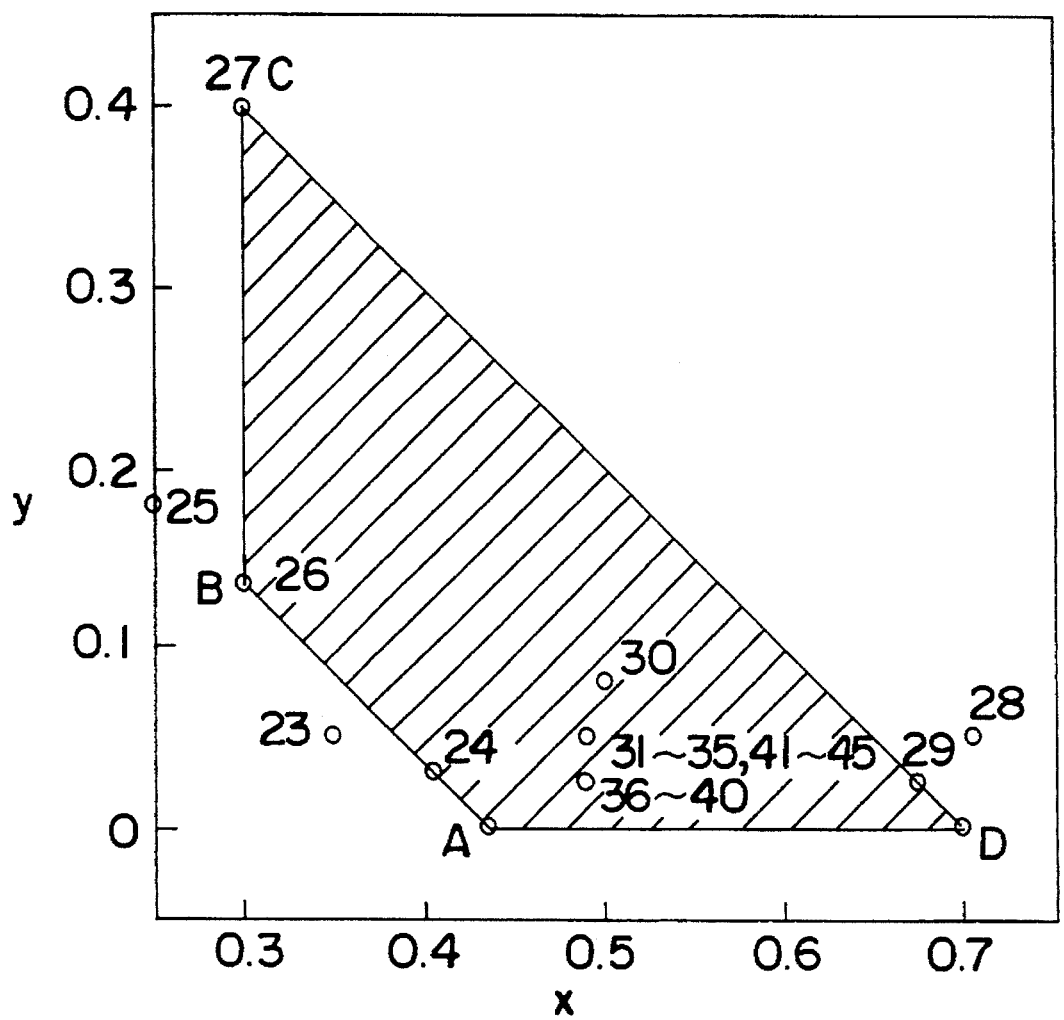

FIG. 4 shows a preferred zone of x and y in a ternary phase diagram of the system represented by the formula:

$$(Pb_{1-x-y}Ca_xSr_y)_{1+a}\{(Fe_{1/2}Nb_{1/2})_{1-z}(Fe_{2/3}W_{1/3})_z\}O_{3+a}$$

DETAILED DESCRIPTION OF THE PREFERRED EMBODIMENTS (EXAMPLE 1)

This example is corresponding to the embodiment defined by the claim 2 of the present invention.

Starting material comprise PbO, $TiO_2$, $CaCO_3$, $Fe_2O_3$, and $Nb_2O_5$ of a high purity. After the purity compensation of each of the starting materials, a given amount of each of the starting materials is weighed to give a composition $(Pb_{1-x}Ca_x)_{1+a}\{(Fe_{1/2}Nb_{1/2})_{1-y}Ti_y\}O_{3+a}$ having x, y and a shown in the following Table 1. Numbers in FIG. 3 indicate the Sample numbers listed in the Table 1. The starting materials are mixed for 17 hours in a ball mill using balls made of stabilized zirconia and pure water as a solvent. The pure water is separated from the starting materials by a filtering process after the ball mill operation. The starting materials are dried, put in an alumina crucible and then pre-heated for two hours at a temperature of 750° to 850° C. The pro-heated materials are crushed into rough particles in a alumina mortar and are crushed for 17 hours in a ball mill. The crushed materials are dried and then further admixed with an aqueous solution of 5% of polyvinyl alcohol. The added aqueous solution is adjusted to be 6 wt. % of the crushed materials. The materials with the aqueous solution are granulated through 30 mesh. The granulated materials are then pressed into a circular disc having a diameter of 13 mm and a height of 5 mm with a pressure of 100 MPa. The pressed disc is heated in air at 600° C. for 2 hours in order to burn out the polyvinyl alcohol and then put in a magnesia crucible having a magnesia cap with the pre-heated same composition powder in order to prevent evaporation of PbO. The disc in the magnesia crucible is heated at a temperature of 950° to 1200° C. for 2 hours and then cooled to give a sintered body having a highest apparent density.

The sintered body is subjected to a test for measuring a resonant frequency and a Q value through a dielectric resonating method. It is possible to calculate a relative dielectric constant ($\epsilon_r$) from the size of the sintered body and the resonant frequency. The resonant frequency ranges from 2 to 5 GHz.

The resonant frequency is measured at temperatures of −25° C., 20° C. and 85° C. and the temperature coefficient ($\tau_r$) thereof is calculated by the least square method. The results are listed in Table 1.

It is to be noted that the compositions shown by a mark (#) shows a composition outside of the composition range according to the present invention.

TABLE 1

| No. | Composition | | | Dielectric constant | Q value | $\tau_r$ ppm/°C. |
|---|---|---|---|---|---|---|
| | X | Y | a | | | |
| 1# | 0.43 | 0 | 0 | 146 | 810 | +99 |
| 2# | 0.50 | 0 | 0 | 113 | 1230 | +38 |
| 3# | 0.57 | 0 | 0 | 90 | 1510 | +2 |
| 4# | 0.63 | 0 | 0 | 70 | 2090 | −14 |
| 5# | 0.43 | 0.02 | 0 | 151 | 840 | +110 |
| 6 | 0.50 | 0.02 | 0 | 117 | 1310 | +40 |
| 7 | 0.57 | 0.02 | 0 | 94 | 1640 | +4 |
| 8 | 0.63 | 0.02 | 0 | 73 | 2190 | −11 |
| 9# | 0.65 | 0.02 | 0 | 66 | 2200 | −2100 |
| 10# | 0.47 | 0.10 | 0 | 147 | 1220 | +109 |
| 11 | 0.50 | 0.10 | 0 | 132 | 1410 | +90 |
| 12# | 0.57 | 0.10 | −0.02 | 99 | 310 | +20 |
| 13 | 0.57 | 0.10 | 0 | 97 | 1830 | +18 |
| 14 | 0.57 | 0.10 | 0.03 | 96 | 1890 | +16 |
| 15 | 0.57 | 0.10 | 0.08 | 92 | 1320 | +12 |
| 16# | 0.57 | 0.10 | 0.10 | 90 | 470 | +10 |
| 17 | 0.65 | 0.10 | 0 | 77 | 2120 | −7 |
| 18# | 0.70 | 0.10 | 0 | 61 | 2250 | −29 |
| 19# | 0.53 | 0.20 | 0 | 143 | 1190 | +112 |
| 20# | 0.57 | 0.20 | −0.02 | 122 | 220 | +92 |
| 21 | 0.57 | 0.20 | 0 | 119 | 1510 | +81 |
| 22 | 0.57 | 0.20 | 0.03 | 117 | 1560 | +76 |
| 23 | 0.57 | 0.20 | 0.08 | 111 | 1020 | +72 |
| 24# | 0.57 | 0.20 | 0.10 | 107 | 480 | +69 |
| 25 | 0.70 | 0.20 | 0 | 75 | 2090 | −1 |
| 26# | 0.74 | 0.20 | 0 | 62 | 2210 | −23 |
| 27 | 0.57 | 0.25 | 0 | 131 | 940 | +98 |
| 28 | 0.74 | 0.25 | 0 | 69 | 2100 | +1 |
| 29# | 0.65 | 0.27 | 0 | 96 | 1200 | +62 |

From the Table 1, the composition not containing Ti, that is, the composition at y=0 has Q value =1510 at the dielectric constant of 90 as shown Sample No. #3 while the composition at y=0.1 has Q value =1830 even at the dielectric constant of 97 as shown Sample No. 13. This means introduction of Ti at B site causes Q value higher. The compositions belonging to the scope of the claim 2 indicate the dielectric constant of more than 70, the Q value of more than 500, the absolute value of the temperature coefficient of less than 100 ppm/° C.

On the other hand, the composition outside scope of the claim 2 having x more than line BC of FIG. 3 comes to indicate the dielectric constant of less than 70, while the composition having y more than line CD indicates a lower Q value when the dielectric constant has same value at y=0 and the composition having x less than line AD indicates the temperature coefficient of +100 ppm/° C. Further, the composition having (a) value less than 0 or more than 0.8 indicates a suddenly lowered Q value. Accordingly, such compositions are not practical to the dielectric body used for a microwave.

it is noted that there is present the composition zone neighboring Sample No.13 indicating such a superior dielectric characteristics as the dielectric constant of more than 95, the Q value of more than 1800, the absolute temperature coefficient of less than 20 ppm/° C.

(EXAMPLE 2)

This example is corresponding to the compositions claimed in the claims 3 and 4.

The methods for preparing the sintered body and evaluating the dielectric characteristics are same as Example 1.

The test composition is represented by the formula:

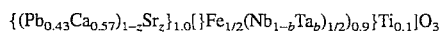
$\{(Pb_{0.43}Ca_{0.57})_{1-z}Sr_z\}_{1.0}[\{Fe_{1/2}(Nb_{1-b}Ta_b)_{1/2}\}_{0.9}Ti_{0.1}]O_3$ As the starting materials of the components Sr and Ta, $SrCO_3$ and $Ta_2O_5$ are used. The results are listed in the following Table 2. The sintering temperature in Table 2 is the temperature at which a highest apparent density is given by sintering. The composition shown by the mark (*) shows a composition within the scope of the claim 2 in the present invention.

From the Table 2, introduction of Sr at A site causes lowering the sintering temperature. The composition having z more than 0.4 indicates a lowered Q value and a positive larger temperature coefficient which is outside of the indicated scope. Especially, as shown in Sample No.3, Sr introduction at z=about 2 causes the sintering temperature to be lowered without substantial degradation of the microwave dielectric characteristics.

Further, substitution of Nb by Ta also causes lowering of the sintering temperature, which results in lowering of the manufacturing cost and depressing of characteristics dispersion

TABLE 2

| No. | Composition | | Sintering temp. °C. | Q constant | value | $\tau_r$ ppm/°C. |
|---|---|---|---|---|---|---|
| | z | b | | | | |
| 1* | 0 | 0 | 1150 | 97 | 1830 | +18 |
| 2 | 0.05 | 0 | 1100 | 98 | 1850 | +17 |
| 3 | 0.20 | 0 | 1050 | 99 | 1900 | +18 |
| 4 | 0.4 | 0 | 1050 | 99 | 1700 | +24 |
| 5# | 0.45 | 0 | 1050 | 100 | 870 | +36 |
| 6 | 0 | 0.1 | 1100 | 96 | 1800 | +16 |
| 7 | 0 | 0.3 | 1050 | 93 | 1740 | +10 |
| 8 | 0 | 0.7 | 1050 | 76 | 1300 | −30 |
| 9 | 0 | 1.0 | 1050 | 57 | 930 | −52 |

(EXAMPLE 3)

This Example is corresponding to the compositions claimed in the claims 5, 6 and 7.

The methods for preparing the sintered body and evaluating the characteristics are the same as Example 1.

The nest sample is represented by the formula:

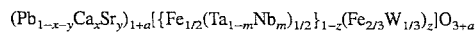
$(Pb_{1-x-y}Ca_xSr_y)_{1+a}[\{Fe_{1/2}(Ta_{1-m}Nb_m)_{1/2}\}_{1-z}(Fe_{2/3}W_{1/3})_z]O_{3+a}$ Sample Nos. 1 to 22 are the compositions containing no Sr (y=0) which correspond to that claimed in the claims 5 and 7. Sample Nos. 23 to 45 are the compositions containing Sr which correspond to the compositions claimed in the claims 6 and 7.

As the starting materials, there are used SrO3, Ta2O5 and WO3. The results are shown in the following Table 3.

TABLE 3

| No. | x | z | m | a | $\epsilon_r$ | Q | $\tau_f$ |
|---|---|---|---|---|---|---|---|
| 1* | 0.41 | 0.25 | 1.0 | 0 | 161 | 320 | +182 |
| 2 | 0.43 | 0.25 | 1.0 | 0 | 152 | 630 | +96 |
| 3 | 0.45 | 0.5 | 1.0 | 0 | 108 | 510 | +37 |
| 4 | 0.5 | 0.02 | 1.0 | 0 | 110 | 1170 | +36 |
| 5 | 0.5 | 0.1 | 1.0 | 0 | 98 | 970 | +15 |
| 6 | 0.525 | 0.1 | 1.0 | 0 | 101 | 1390 | +1 |
| 7 | 0.525 | 0.25 | 1.0 | 0 | 100 | 1160 | −4 |
| 8 | 0.525 | 0.5 | 1.0 | 0 | 87 | 720 | −36 |
| 9* | 0.525 | 0.6 | 1.0 | 0 | 71 | 320 | −174 |
| 10 | 0.55 | 0.25 | 1.0 | 0 | 94 | 1365 | −18 |
| 11 | 0.6 | 0.25 | 1.0 | 0 | 83 | 1795 | −38 |
| 12 | 0.63 | 0.25 | 1.0 | 0 | 64 | 1970 | −47 |
| 13* | 0.65 | 0.25 | 1.0 | 0 | 47 | 2105 | −77 |
| 14 | 0.525 | 0.25 | 0.8 | 0 | 94 | 1040 | −13 |
| 15 | 0.525 | 0.25 | 0.5 | 0 | 77 | 870 | −37 |
| 16 | 0.525 | 0.25 | 0.2 | 0 | 68 | 710 | −44 |
| 17 | 0.525 | 0.25 | 0 | 0 | 61 | 640 | −57 |
| 18 | 0.55 | 0.25 | 1.0 | 0.01 | 95 | 1295 | −39 |
| 19 | 0.55 | 0.25 | 1.0 | 0.05 | 82 | 975 | −44 |
| 20 | 0.55 | 0.25 | 1.0 | 0.08 | 67 | 540 | −47 |
| 21* | 0.55 | 0.25 | 1.0 | 0.1 | 61 | 370 | −52 |
| 22 | 0.525 | 0.1 | 0.5 | 0.05 | 72 | 710 | −43 |

| No. | x | y | z | m | a | $\epsilon$ | Q | $\tau_f$ |
|---|---|---|---|---|---|---|---|---|
| 23* | 0.35 | 0.05 | 0.2 | 1.0 | 0 | 142 | 470 | +128 |
| 24 | 0.405 | 0.025 | 0.2 | 1.0 | 0 | 127 | 770 | +72 |
| 25* | 0.25 | 0.18 | 0.2 | 1.0 | 0 | 133 | 540 | +110 |
| 26 | 0.3 | 0.13 | 0.2 | 1.0 | 0 | 132 | 590 | +94 |
| 27 | 0.3 | 0.4 | 0.2 | 1.0 | 0 | 74 | 510 | −12 |
| 28* | 0.7 | 0.05 | 0.2 | 1.0 | 0 | 41 | 2105 | −119 |
| 29 | 0.675 | 0.025 | 0.2 | 1.0 | 0 | 52 | 2010 | −84 |
| 30 | 0.5 | 0.075 | 0.5 | 1.0 | 0 | 83 | 630 | −28 |
| 31 | 0.4875 | 0.05 | 0.1 | 1.0 | 0 | 101 | 1350 | +10 |
| 32 | 0.4875 | 0.05 | 0.2 | 1.0 | 0 | 100 | 1230 | +2 |
| 33 | 0.4875 | 0.05 | 0.4 | 1.0 | 0 | 98 | 750 | −16 |
| 34 | 0.4875 | 0.05 | 0.7 | 1.0 | 0 | 83 | 560 | −41 |
| 35* | 0.4875 | 0.05 | 0.8 | 1.0 | 0 | 77 | 370 | −72 |
| 36 | 0.4875 | 0.025 | 0.1 | 1.0 | 0 | 113 | 1410 | +30 |
| 37 | 0.4875 | 0.025 | 0.1 | 0.7 | 0 | 101 | 1210 | +24 |
| 38 | 0.4875 | 0.025 | 0.1 | 0.5 | 0 | 93 | 1010 | +11 |
| 39 | 0.4875 | 0.025 | 0.1 | 0.2 | 0 | 71 | 855 | −4 |
| 40 | 0.4875 | 0.025 | 0.1 | 0 | 0 | 66 | 800 | −13 |
| 41 | 0.4875 | 0.05 | 0.1 | 1.0 | 0.01 | 102 | 1320 | +9 |
| 42 | 0.4875 | 0.05 | 0.1 | 1.0 | 0.05 | 80 | 825 | −4 |
| 43 | 0.4875 | 0.05 | 0.1 | 1.0 | 0.08 | 64 | 515 | −8 |
| 44* | 0.4875 | 0.05 | 0.1 | 1.0 | 0.1 | 52 | 195 | −7 |
| 45 | 0.4875 | 0.05 | 0.25 | 0.8 | 0.01 | 100 | 1170 | −4 |

As shown in Table 3, the compositions claimed in the claims 5, 6 and 7, achieve a dielectric constant higher than 50, a Q value higher than 500 and the temperature coefficient of resonant frequency $\tau_f$ less than 100 ppm/° C. in an absolute value.

An increase of (z) in the formula, that is, an increase of W of the composition results in a somewhat decrease in the Q value but results in a higher dielectric constant at the same temperature coefficient. Addition of W more than the scope of the invention causes remarkable lowering of the Q value. All the composition claimed in the claims are sintered at a temperature of less than 1100° C.

As shown above, the composition of dielectric ceramics are provided with excellent dielectric characteristics at the microwave band.

It is possible to make a resonator in a small size superior in the temperature characteristics when the resonator is composed of a dielectric body having a dielectric constant higher than 100, a practical Q value and a small temperature coefficient. Such a resonator is very useful for the miniaturization of the car telephone and a portable telephone. The compositions according to the present invention can be sintered at a temperature lower than the temperature used in the conventional dielectric body This results in a decrease in the manufacturing cost. The dielectric compositions according to the present invention can applicable for use to the small, coaxial dielectric resonator: The composition according to the present invention can be sintered at a low temperature at which an electric conductor such as copper or silver paste can be sintered and accordingly can be used for formation of a circuit substrate for the microwave band and an integrated device. It can be said that the composition according to the present invention makes a big contribution to the electronic industry.

It is possible to add any oxide materials such as Ba, Cr, Mn, Co, Ni, Cu, Zn, Si, Al, Mg, Bi and Sb other than the oxides defined by the Examples so long as the other oxides have no bad effect, such as the dielectric constant and Q value decrease and the temperature coefficient increase, on the dielectric characteristics of the resultant dielectric body.

What is claimed is:

1. A dielectric ceramic composition represented by the following formula:

$$A_{1+a}BO_{3+a}$$

wherein $0.08 \geq a \geq 0$ and the A site mainly contains at least Pb and Ca, where in Ca which is more than 20% of A and optionally contains Sr or Ba, and the B site mainly contains Fe and Nb and at least one member selected from the group consisting of Ti and W which control the dielectric constant and temperature coefficient of resonant frequency.

2. The dielectric ceramic composition according to claim 1, which comprises lead oxide, calcium oxide, iron oxide, niobium oxide and titanium oxide and being represented by the following formula:

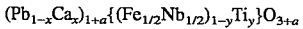

$$(Pb_{1-x}Ca_x)_{1+a}\{(Fe_{1/2}Nb_{1/2})_{1-y}Ti_y\}O_{3+a}$$

wherein x and y are within a phase diagram square area enclosed by the following four points A, B, C and D, but not including line A–B ( y=0 ):
A: (x,y)=(0.43, 0.0);
B: (x,y)=(0.63, 0.0);
C: (x,y)=(0.74, 0.25);
D: (x,y) =(0.57, 0.25);
and a is defined by the following relation:

$$0.0 \leq a \leq 0.08.$$

3. The dielectric ceramic composition according to claim 1, which comprises lead oxide, calcium oxide, iron oxide, niobium oxide, titanium oxide and strontium oxide and being represented by the following formula:

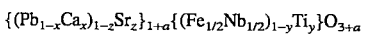

$$\{(Pb_{1-x}Ca_x)_{1-z}Sr_z\}_{1+a}\{(Fe_{1/2}Nb_{1/2})_{1-y}Ti_y\}O_{3+a}$$

wherein x and y are within a phase diagram square area without y=0, enclosed by the following four points A, B, C and D, but not including line A-B (y=0):
A: (x,y)=(0.43, 0.0);
B: (x,y)=(0.63, 0.0);
C: (x,y)=(0.74, 0.25);
D: (x,y)=(0.57, 0.25);

and a and z are defined by the following relations:

$$0.0 < a < 0.08$$

$$0.0 < z \leq 0.4.$$

4. The dielectric ceramic composition according to claims 2 or 3, wherein a part or all of Nb of the composition is substituted with Ta and is represented by the following formula:

$$\{(Pb_{1-x}Ca_x)_{1-z}Sr_z\}_{1+a}[\{Fe_{1/2}(Ta_{1-m}Nb_m)_{1/2}\}_{1-y}Ti_y]O_{3+a}$$

wherein m is defined by the following relation:

$$0.0 \leq m \leq 1.0$$

5. The dielectric ceramic composition according to claim 1, which comprises lead oxide, calcium oxide, iron oxide, niobium oxide and tungsten oxide and being represented by the following formula:

$$(Pb_{1-x}Ca_x)_{1+a}\{(Fe_{1/2}Nb_{1/2})_{1-z}(Fe_{2/3}W_{1/3})_z\}O_{3+a}$$

wherein x, z and a are defined by the following relations:
$0.43 \leq x \leq 0.63$;
$0.0 < z \leq 0.5$; and
$0.0 \leq a \leq 0.08$.

6. The dielectric ceramic composition according to claim 1, which comprises lead oxide, calcium oxide, strontium oxide, iron oxide, niobium oxide and tungsten oxide and is represented by the following formula:

$$(Pb_{1-x-y}Ca_xSr_y)_{1+a}\{(Fe_{1/2}Nb_{1/2})_{1-z}(Fe_{2/3}W_{1/3})_z\}O_{3+a}$$

wherein x and y are within a phase diagram square area, enclosed by the following four points A, B, C and D, but not including line A–D (y=0):
A: (x,y)=(0.43, 0.0);
B: (x,y)=(0.3, 0.13);
C: (x,y)=(0.3, 0.4);
D: (x,y)=(0.7, 0.0);
and a and z are defined by the following relations:

$$0.0 \leq a \leq 0.08$$

$$0.0 < z \leq 0.7$$

7. The dielectric ceramic composition according to claims 5 or 6, wherein a part or all of Nb of the composition is substituted by Ta and is represented by the following formula:

$$(Pb_{1-x-y}Ca_xSr_y)_{1+a}[\{Fe_{1/2}(Ta_{1-m}Nb_m)_{1/2}\}_{1-z}(Fe_{2/3}W_{1/3})_z]O_{3+a}$$

wherein m is defined by the following relation:

$$0.0 \leq m < 1.0$$

8. The dielectric ceramic composition according to claim 1, wherein the B site may contain at least one member selected from the group consisting of Cr, Mn, Co, Ni, Cu, Zn, Si, Al, Mg, Bi and Sb.

* * * * *